(12) United States Patent
Singer et al.

(10) Patent No.: US 11,070,068 B2
(45) Date of Patent: Jul. 20, 2021

(54) BATTERY PACK AND METHOD FOR DISCHARGING THE SAME AFTER A FAULT EVENT

(71) Applicant: International Business Machines Corporation, Armonk, NY (US)

(72) Inventors: Noah Singer, White Plains, NY (US); Steven John Ahladas, Highland, NY (US); Robert K. Mullady, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

(21) Appl. No.: 16/268,898

(22) Filed: Feb. 6, 2019

(65) Prior Publication Data
US 2020/0251915 A1   Aug. 6, 2020

(51) Int. Cl.
| | | |
|---|---|---|
| *H02J 7/00* | (2006.01) | |
| *H01M 10/42* | (2006.01) | |
| *H01M 10/48* | (2006.01) | |
| *H01M 10/0525* | (2010.01) | |
| *H01M 10/44* | (2006.01) | |

(52) U.S. Cl.
CPC ....... *H02J 7/0026* (2013.01); *H01M 10/0525* (2013.01); *H01M 10/425* (2013.01); *H01M 10/443* (2013.01); *H01M 10/482* (2013.01); *H01M 10/486* (2013.01); *H02J 7/0016* (2013.01); *H01M 2010/4271* (2013.01)

(58) Field of Classification Search
CPC ...... H02J 7/0016; H02J 7/0026; H02J 7/0029; H02J 7/00302; H02J 7/00304; H02J 7/00306; H02J 7/00308; H02J 7/00309; H01M 10/425; H01M 10/482; H01M 10/0525; H01M 10/443; H01M 10/486; H01M 2010/4271; Y02E 60/10
USPC ......................................................... 320/134
See application file for complete search history.

(56) References Cited

U.S. PATENT DOCUMENTS

| | | | |
|---|---|---|---|
| 6,046,575 A | 4/2000 | Demuro | |
| 6,504,344 B1 | 1/2003 | Adams et al. | |
| 6,882,129 B2 * | 4/2005 | Boskovitch | ............. B60L 58/10 |
| | | | 320/119 |
| 7,081,737 B2 | 7/2006 | Liu et al. | |

(Continued)

OTHER PUBLICATIONS

FedEx.com, "Lithium Metal Batteries", [online]; http://images.fedex.com/downloads/shared/packagingtips/lithiumbatteryflowchart.pdf (retrieved on Jan. 7, 2020), 5 pages.

(Continued)

*Primary Examiner* — M Baye Diao
(74) *Attorney, Agent, or Firm* — Cantor Colburn LLP; Tihon Poltavets

(57) ABSTRACT

A battery pack configured for discharging to a desired state of charge (SoC) after a fault event that includes a plurality of battery cells and a balancing circuit connected to each of the battery cells. The balancing circuit is configured to measure operational values of each of the battery cells. The battery pack further includes a microcontroller configured to receive the operational values from the balancing circuit, compare the operational values to a prescribed threshold values and issue commands to selectively discharge one or more of the battery cells across the balancing circuit.

13 Claims, 6 Drawing Sheets

(56) References Cited

U.S. PATENT DOCUMENTS

| | | | | |
|---|---|---|---|---|
| 7,378,819 | B2* | 5/2008 | Wang | H02J 7/0071 320/121 |
| 7,564,216 | B2 | 7/2009 | Carrier et al. | |
| 7,772,799 | B2* | 8/2010 | Wu | H01M 10/6567 320/104 |
| 8,212,522 | B2* | 7/2012 | Deal | H01M 10/4207 320/116 |
| 8,306,771 | B2* | 11/2012 | Houldsworth | H01M 10/486 702/130 |
| 8,577,630 | B2 | 11/2013 | Heizer et al. | |
| 8,640,629 | B2* | 2/2014 | Barbee | B60L 58/22 105/61 |
| 8,831,904 | B2* | 9/2014 | Houldsworth | G01K 13/00 702/130 |
| 8,937,452 | B2* | 1/2015 | Schwarz | H01M 10/42 320/104 |
| 8,981,589 | B2* | 3/2015 | Lienkamp | B60L 50/51 307/9.1 |
| 8,988,078 | B2* | 3/2015 | Kiuchi | H02J 7/0021 324/434 |
| 9,093,240 | B2* | 7/2015 | Ahladas | H01H 83/02 |
| 9,203,122 | B2* | 12/2015 | Raghavan | G01L 1/246 |
| 9,362,759 | B2* | 6/2016 | Nakao | H02J 7/0021 |
| 9,368,991 | B2* | 6/2016 | Qahouq | H02J 7/0018 |
| 9,614,383 | B2 | 4/2017 | Boggs et al. | |
| 9,774,197 | B1 | 9/2017 | Li et al. | |
| 10,026,998 | B2* | 7/2018 | Li | H01M 10/44 |
| 10,075,005 | B2* | 9/2018 | Fisher | H02J 7/0063 |
| 10,128,546 | B2 | 11/2018 | Wand et al. | |
| 10,132,870 | B2 | 11/2018 | Wang et al. | |
| 10,195,948 | B2* | 2/2019 | O'Hara | B60L 3/0046 |
| 10,330,739 | B2* | 6/2019 | Quiambao | H02J 7/0018 |
| 10,608,294 | B2* | 3/2020 | Sasaki | H01M 10/44 |
| 2004/0189248 | A1* | 9/2004 | Boskovitch | B60L 58/10 320/116 |
| 2010/0010769 | A1* | 1/2010 | Houldsworth | G01K 7/427 702/130 |
| 2010/0287389 | A1 | 11/2010 | Gangsto et al. | |
| 2011/0018501 | A1 | 1/2011 | Litingtun et al. | |
| 2012/0212184 | A1 | 8/2012 | Klein et al. | |
| 2012/0274284 | A1* | 11/2012 | Firehammer | H01M 10/482 320/118 |
| 2012/0306506 | A1* | 12/2012 | Kiuchi | B60L 58/21 324/434 |
| 2012/0319654 | A1 | 12/2012 | Li | |
| 2013/0300373 | A1* | 11/2013 | Vivanco-Sarabia | H02J 9/061 320/134 |
| 2014/0266049 | A1 | 9/2014 | Benckenstein, Jr. et al. | |
| 2015/0309121 | A1* | 10/2015 | Butzmann | G01R 31/3835 324/434 |
| 2017/0054306 | A1* | 2/2017 | Vo | H02J 7/0021 |
| 2018/0151919 | A1* | 5/2018 | Sasaki | H01M 10/44 |
| 2018/0262017 | A1 | 9/2018 | Hsu et al. | |
| 2020/0251915 | A1* | 8/2020 | Singer | H01M 10/486 |

OTHER PUBLICATIONS www.iata.org, "Smart Baggage with Integrated Litium Batteries and/or Electronics", [online]; https://www.iata.org/whatwedo/cargo/dgr/Documents/lithiumbattery-guidance-document-2017-en.pdf (retrieved on Jan. 7, 2020), 6 pages.

Lukasiewycz et al.; "Verification of Balancing Architectures for Modular Batteries", CODES+ISSS ESWEEK'14 ACM International Conference On, pp. 1-10, Oct. 12-17, 2014.

Mundra et al.; "Micro Power Battery State-Of-Charge Monitor", IEEE Transactions on Consumer Electronics, vol. 54, No. 2, pp. 623-630, May 2008.

Narayanaswamy et al.; "Modular Active Charge Balancing for Scalable Battery Packs", VLSI IEEE Transactions on Very Large Scale Integration Systems, vol. 25, Issue 3, pp. 974-987, Mar. 2017.

Teja et al.; "Smart Battery Management System With Active Cell Balancing", Indian Journal of Science and Technology, vol. 8, Issue 19, IPL104, pp. 1-6, Aug. 2015.

Wu et al.; "Improving Battery Safety by Early Detection of Internal Shorting With a Bifunctional Separator", Nature Communications, pp. 1-6, Oct. 13, 2014.

* cited by examiner

BATTERY PACK AND METHOD FOR DISCHARGING THE SAME AFTER A FAULT EVENT

BACKGROUND

The present invention generally relates to discharging energy storage systems. More specifically, the present invention relates to a battery pack and method for discharging the battery pack to a desired state of charge (SoC), containing, for example, lithium-ion batteries, after a fault event, component failure or at end of life.

Batteries are a convenient source of electrical energy for many types of stationary, portable and/or mobile electronics. A typical battery is formed by the connection of a number of electrical cells connected in a series or in parallel configuration, i.e. a battery pack. Many types of battery packs include rechargeable cells, such that when an outside energy source is applied to the cells energy is stored within the cells. While many chemical combinations for the cathode and the anode of the cells exist, some commonly used combinations include nickel cadmium (NiCd), nickel metal hydride (NiMH), and lithium ion (Li-Ion) compositions.

Maintenance and management operations for a battery pack needing replacement include discharging the battery pack safely and quickly to a desired state of charge (SoC) level after a fault event or at end of life. The desired SoC level is important for safe storage, disposal or shipment of the battery pack after a fault event or at end of life. For example, the International Air Transport Association (IATA) requires lithium ion cells or battery packs to be shipped at 30% SoC or less. The desired SoC level could require a discharging operation of the battery pack in order to achieve the necessary SoC level.

There is, therefore, a need to discharge a battery pack to the desired SoC level after a fault event or at end of life to safely store, dispose or transport the battery pack after the fault event or at end of life.

SUMMARY

In one aspect, the present invention provides a battery pack configured for discharging to a desired state of charge (SoC) after a fault event. The battery pack includes a plurality of battery cells and a balancing circuit connected to each of the battery cells. The balancing circuit is configured to measure the operational values of each of the battery cells. The battery pack further includes a microcontroller configured to receive the operational values from the balancing circuit, compare the operational values to a prescribed threshold values and issue commands to selectively discharge one or more of the battery cells across the balancing circuit.

In another aspect, the present invention provides a battery pack configured for discharging to a desired state of charge (SoC) after a fault event. The battery pack includes a plurality of battery cells and a balancing circuit connected to each of the battery cells. The battery pack further includes a microcontroller configured to receive operational values of each of the battery cells, compare the operational values of each of the battery cells to a prescribed threshold values and issue commands to selectively discharge one or more of the battery cells. Even further a battery management system configured to receive the operational values from each of the battery cells, wherein the battery management system communicates the measured operational values of each of the battery cells to the microcontroller or receives a command from the microcontroller to selectively discharge one or more of the battery cells. The microcontroller discharges the battery cells via a suicide switch to a desired state of charge (SoC).

In one aspect, the present invention provides a method for discharging a battery pack to a desired SoC after a fault event. The method includes monitoring the battery pack where the battery pack includes a plurality of battery cells and a balancing circuit connected to each of the battery cells. The balancing circuit is configured to measure the operational values of each of the battery cells. The battery pack further includes a microcontroller configured to receive the operational values from the balancing circuit, compare the operational values to a prescribed threshold values and issue commands to selectively discharge one or more of the battery cells across the balancing circuit. The method further includes discharging to the desired SoC of each of the non-failed battery cells, determining whether the desired SoC is reached and sending an alert signal to a user upon the desired SoC being reached. Upon sending the alert to the user, the final step is disconnecting the battery pack from a system.

In one aspect, the present invention provides a method for discharging a battery pack to a desired state of charge (SoC) upon reaching end of life (EoL). The method includes monitoring the battery pack for predetermined EoL indicators, where the battery pack includes a plurality of battery cells and a balancing circuit connected to each of the battery cells. The balancing circuit is configured to measure the operational values of each of the battery cells. The battery pack further includes a microcontroller configured to receive the operational values from the balancing circuit, compare the operational values to a prescribed threshold values and issue commands to selectively discharge one or more of the battery cells across the balancing circuit. The method further includes discharging to the SoC of each of the battery cells across the corresponding balancing circuit upon detection of the predetermined EoL indicators, determining whether the desired SoC is reached, and sending an alert signal to a user upon the desired SoC being reached. Upon sending the alert to the user, the final step is disconnecting the battery pack from a system.

BRIEF DESCRIPTION OF THE DRAWINGS

In order for the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, aspects of the invention will be described and explained with additional specificity and detail through the use of the accompanying drawings.

DETAILED DESCRIPTION

Figure 1:
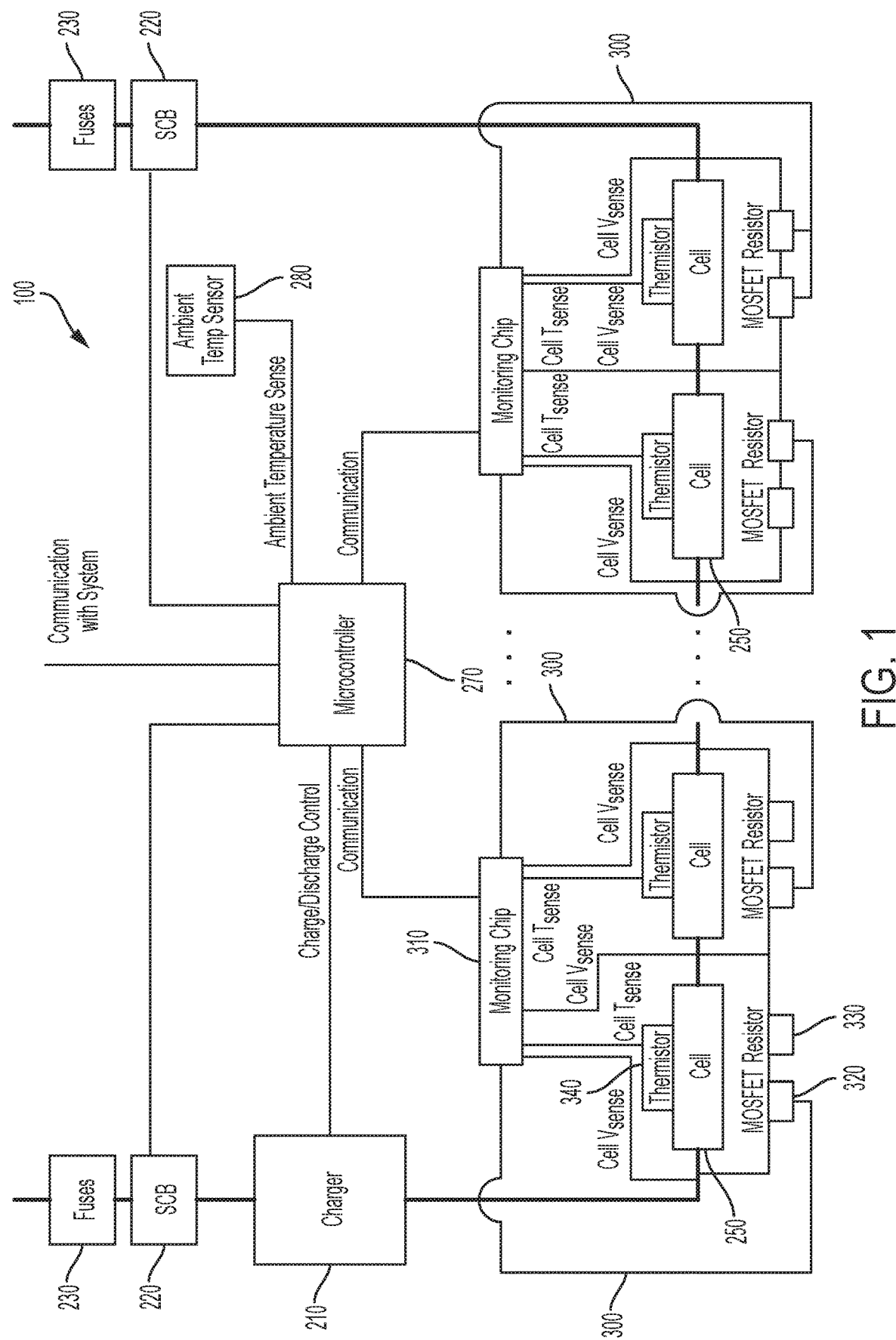
FIG. 1 depicts a diagram of a battery pack configuration for discharging to a desired state of charge (SoC) after a fault event according to embodiments of the invention.

Reference to "a specific embodiment" or a similar expression in the specification means that specific features, structures, or characteristics described in the specific embodiments are included in at least one specific embodiment of the present invention. Hence, the wording "in a specific embodiment" or a similar expression in this specification does not necessarily refer to the same specific embodiment.

Hereinafter, various embodiments of the present invention will be described in more detail with reference to the accompanying drawings. Nevertheless, it should be understood that the present invention could be modified by those skilled in the art in accordance with the following description to achieve the excellent results of the present invention. Therefore, the following description shall be considered as a pervasive and explanatory description related to the present invention for those skilled in the art, not intended to limit the claims of the present invention.

Reference to "an embodiment," "a certain embodiment" or a similar expression in the specification means that related features, structures, or characteristics described in the embodiment are included in at least one embodiment of the present invention. Hence, the wording "in an embodiment," "in a certain embodiment" or a similar expression in this specification does not necessarily refer to the same specific embodiment.

A battery pack, containing, for example, lithium-ion battery cells, configured for discharging to a desired SoC after a fault event, is provided. Generally, a lithium-ion cell includes an anode, a cathode, and an electrolyte disposed between the anode and the cathode. Lithium-ion cells are produced in a number of variations. For example, the most popular lithium-ion cells, which have the highest energy density, use a cobalt or nickel-cobalt oxide anode. However, these batteries are prone to experiencing thermal runaway, which causes fires and can occur due to a variety of causes or conditions within the battery pack, such as an internal short circuit, overcharging, failure of a cell, failure of a power component (e.g., a fuse or transistor) or other causes.

Due to the dangers associated with the fault events, such as those described above, a battery pack that experienced one or more of such fault events during operation must be discharged to a desired state of charge (SoC) levels before the damaged battery pack is stored, disposed of or shipped to a facility for disposal or failure analysis. Depending on the situation or conditions, the desired SoC can vary. For example, International Air Transport Association's (IATA) requirements prevent lithium ion cells from being shipped above 30% SoC.

Generally, if a fault event (e.g., failure of a cell or a battery pack component) took place, the battery pack must be discharged to the desired SoC level manually because the discharge across a system (i.e., load) after the fault event is not possible due to a broken connection (i.e., an open circuit). In other words, a skilled technician must manually disassemble the battery pack and manually discharge each cell in the battery pack. This is a challenging, time-consuming and potentially dangerous procedure.

Further, when a battery pack reaches end of life (EoL), the battery pack generally continues to hold a set percentage of its original charge capacity. EoL does not necessarily mean that the battery pack is no longer operational, but rather EoL is the point at which the battery pack will hold only a set percentage of its original storage capacity and is no longer able to support the requirements of the application. In addition to the reduced ability to hold a charge, reaching EoL can also be associated with other indicators of decreased performance, such as a poorer ratio of "energy in" to "energy out" and in some batteries an increased risk of other malfunction that could render them unusable or unreliable. The battery pack that reached EoL must be discharged to the desired level (e.g., 30% SoC) to be stored, disposed or shipped to a facility for disposal or failure analysis.

In the case of a battery pack reaching EoL, discharging the battery pack to the desired SoC level requires disabling a power input of a power supply, which allows the battery pack to discharge the remaining energy across the system. However, such discharging procedure has increased risk of the system not receiving the necessary load if there is an issue with restarting the power supply after the power input of the power supplied was once again enabled.

FIG. 1 illustrates a block diagram of a battery pack 100 configured for discharging the battery pack 100, containing a plurality of battery cells 250, after a fault event that addresses the issues and shortcoming of the methods for discharging battery packs after the fault events or upon reaching EoL described above. The battery cells 250 may be of various rechargeable types known in the art, such as lithium-ion, nickel-cadmium, nickel-metal hydride batteries, or the like.

A fault event can be any incident or occurrence that hinders and/or prevents normal operation of the battery pack 100. For example, over-voltage or overheating may cause one or more battery cells 250 to operate under low discharge efficiency or have low charging power or fail to perform. The electrodes of the battery cells 250 (when the battery cells 250 are lithium-ion batteries) expand and contract during charging and discharging due to the effect of the intercalation of the lithium ions into and out of the crystal structure of the electrodes. The cyclic stresses on the electrodes can eventually lead to cracking of the particles making up the electrode resulting in increased internal impedance as the cell ages, or a breakdown of the anode layers which leads to overheating and immediate battery cell failure. In addition, a fault event can be a failure of a power component, such as a fuse. The fuse can "blow" in over-voltage and reverse-voltage conditions thereby preventing the operation of the battery pack 100. Another known cause of the battery pack 100 failure is high current flow through the battery cells 250 that in turn prevents the battery pack 100 from cooling, thereby causing overheating and subsequent operational failure of the battery pack 100.

The battery pack 100 further includes a charger 210 that can be connected through static circuit breakers (SCB) 220 and a fuse 230 in series to an outside system. The charger 210 is also coupled to the plurality of battery cells 250 and a microcontroller 270. The microcontroller 270 can be, for example, a microprocessor, an analog circuit, a digital signal processor or one or more single application specific integrated circuit. The microcontroller 270 controls the proper operation of the battery pack 100, for example, undertakes balancing procedure of the battery cells 250 or controls the discharge function of a balancing circuit 300 (in more detail described below) based on the operational condition values received from, for example, a plurality of monitoring chips 310.

As illustrated in FIG. 1, the microcontroller 270 resides separately and is in communication with the plurality of monitoring chips 310 via data lines. Each monitoring chip 310 operatively communicates with one or more of the battery cells 250. The monitoring chip can be a single integrated circuit (IC) or include any combination of hardware or software that cooperate to monitor and communicate the battery cells' 250 operational condition values to the microcontroller 270. For example, the monitoring chip 310 can determine SoC, open circuit voltage (OCV), current draw, and temperature of each of the battery cells 250. By using digital communication lines, the monitoring chips 310 can send and receive commands to and from the microcontroller 270. As further shown in FIG. 1, one monitoring chip 310 can be in communication with two battery cells 250.

According to the embodiment shown in FIG. 1, the microcontroller 270 operates on an outside system power when the battery pack 100 is connected to the outside system. The microcontroller 270 can direct via digital communications lines one or more of the monitoring chips 310 to monitor each of the battery cells 250 for overall operational conditions, i.e., State of Health (SoH), or any specific predetermined condition. In addition, according to embodiments of the present invention, the microcontroller 270 controls the discharge function of the battery pack 100.

As shown in FIG. 1, each battery cell 250 is coupled in parallel to a corresponding balancing circuit 300. Each balancing circuit 300 can function as a monitoring circuit and/or balancing circuit. According to embodiments of the present invention, each battery cell 250 can be discharged to the desired SoC (e.g., 30% or below) across the corresponding balancing circuit 300. In other words, when certain predetermined conditions are met (e.g. after a fault event), the microcontroller 270 can direct the monitoring chips 310 to discharge an individual or multiple battery cells across the corresponding balancing circuit 300 via balancing semiconductor devices to a desired SoC as further described below.

As further shown in FIG. 1, the balancing circuit 300 includes a field effect transistor (FET) 320 and a balancing resistor 330 coupled in parallel with each battery cell 250. The FET 320 can be, for example, a metal-oxide semiconductor field-effect transistor (MOSFET). Each FET 320 can have a source electrode (S) coupled to a negative (−) terminal of the monitoring chip 310, while a drain electrode (D) coupled to a positive (+) electrode of the monitoring chip 310 via the balancing resistor 330. A control signal provided from the microcontroller 270 to the monitoring chip 310 can be applied to a gate electrode (G) (not shown) of the FET 320, thereby the turn ON/OFF function of the FET 320 is controlled by the control signal generated by the microcontroller 270 and applied to the battery cell 250 via the monitoring chip 310. Accordingly, each FET 320 upon receiving the control signal from the microcontroller 270 via the corresponding monitoring chip 310 facilitates the discharging function of the balancing circuit 300 where each battery cell 250 is discharged by the balancing resistor 330 to the desired SoC across the balancing circuit 300. Although specific FETs and resistors are set forth in embodiments of this invention for implementing the balancing circuit 300, persons skilled in the art will recognize that many other variations of the balancing circuit 300 are possible to implement the discharging functionality where each battery cell 250 is discharged across the balancing circuit 300.

When the discharging of the battery cell 250 is achieved, heat may be generated in the balancing resistor 330. Heat can also be generated as a result of a fault event in the battery cell 250 or other causing heat conditions, for example, enthalpy changes, electrochemical polarization or resistive heating inside the battery cell 250. Accordingly, as shown in FIG. 1 a thermistor 340 can be provided in the balancing circuit 300 to measure terminal temperature of the battery cell 250. The thermistor 340 can be physically bonded to either the positive (+) or negative (−) terminals of the battery cell 250. As is well understood in the art, thermistors are temperature sensitive devices whose resistance changes with respect to temperature. The monitoring chip 310 determines that the output of the thermistor 340 indicates that the temperature of the corresponding battery cell 250 has fallen outside upper or lower predetermined temperature limit values, the monitoring chip 310 provides an output, namely, an alert signal, to the microcontroller 270 which can be used to initiate corrective action. According to embodiments of the invention, each of the batteries cells 250 can include a temperature and/or voltage monitoring device other than the thermistor 340, such as a processor that can oversee the state of each individual battery cell 250.

According to embodiments of the present invention, as shown in FIG. 1, the battery pack 100 can also include an ambient temperature sensor 280 that is positioned outside the balancing circuit 300. The ambient temperature sensor 280 communicates the sensed ambient temperature within the battery pack 100 to the microcontroller 270.

Figure 2:
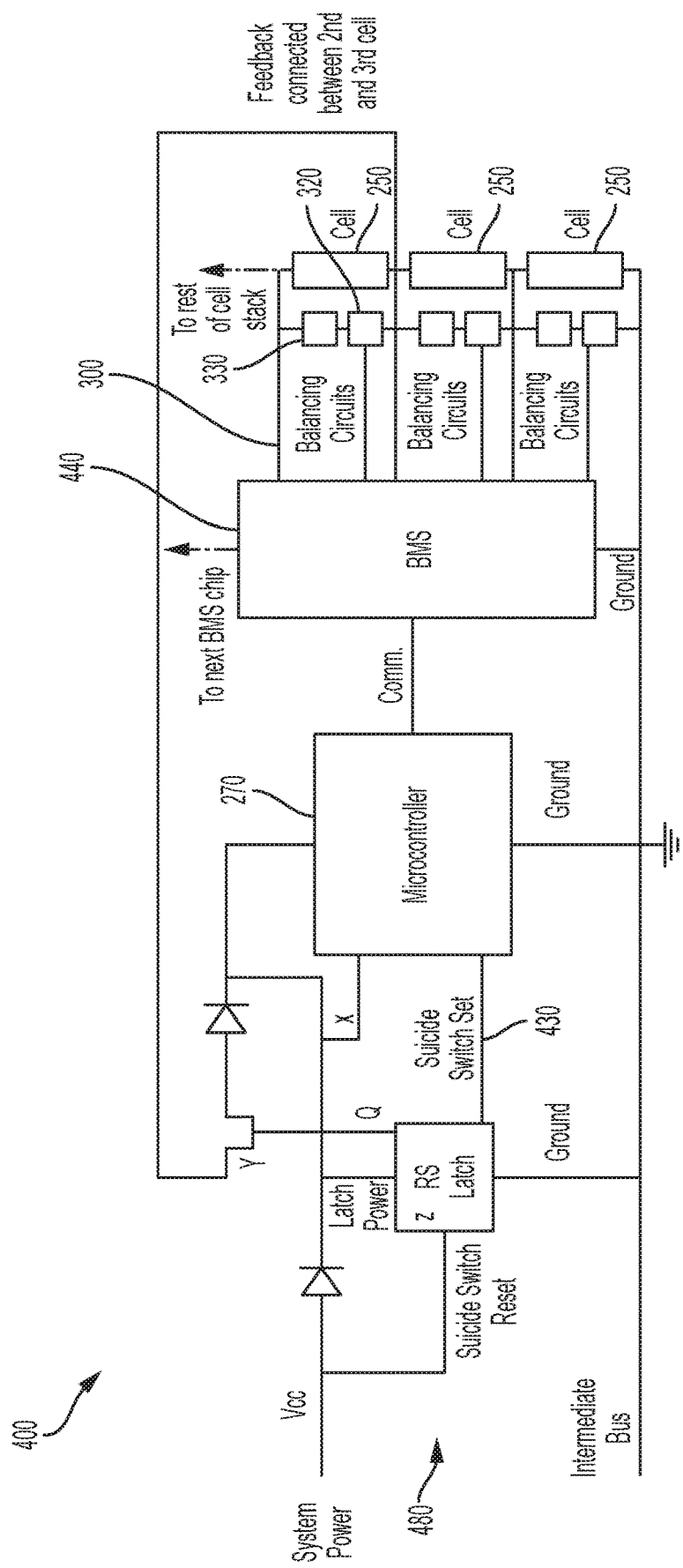
FIG. 2 depicts a diagram of a battery pack configuration where a suicide switch is implemented in accordance with embodiments of the invention.

FIG. 2 illustrates another embodiment of the present invention, where a battery pack 400 can be discharged after a fault event when the outside system power is removed. In this embodiment of the present invention, when the outside system power is removed, the microcontroller 270 is powered by the plurality of battery cells 250 of the battery pack 400, rather than the outside system power as described in the preceding paragraphs and shown in FIG. 1.

As shown in FIG. 2, each battery cell 250 is coupled in parallel to the balancing circuit 300. The balancing circuit 300 is connected to a battery management system (BMS) 440 that is in communication with the microcontroller 270. As further shown in FIG. 2, the balancing circuit 300 includes the field effect transistor (FET) 320 and the balancing resistor 330 coupled in parallel with each of the battery cells 250.

In this configuration, during the discharge operation of the battery cell 250 due to a fault event or the battery cell 250 reaching EoL, the microcontroller 270 senses the loss of system power via a power-loss detector (not shown) at "X". Upon sensing the loss of power, the microcontroller 270 continues to operate the battery pack 400 by power provided through the battery cells 250 via an electronic switch "Y" which is "ON" from a latch "Z". Once the desired SoC level is reached, the microcontroller 270 removes the power from itself via a suicide switch 430 and the latch "Z" to prevent the self-discharge power into the microcontroller 270 from reducing the battery cell voltage to a damaging level. When the system power is restored, the latch "Z" is reset enabling the microcontroller 270 to be powered from the battery cells 250 again.

Figure 3:
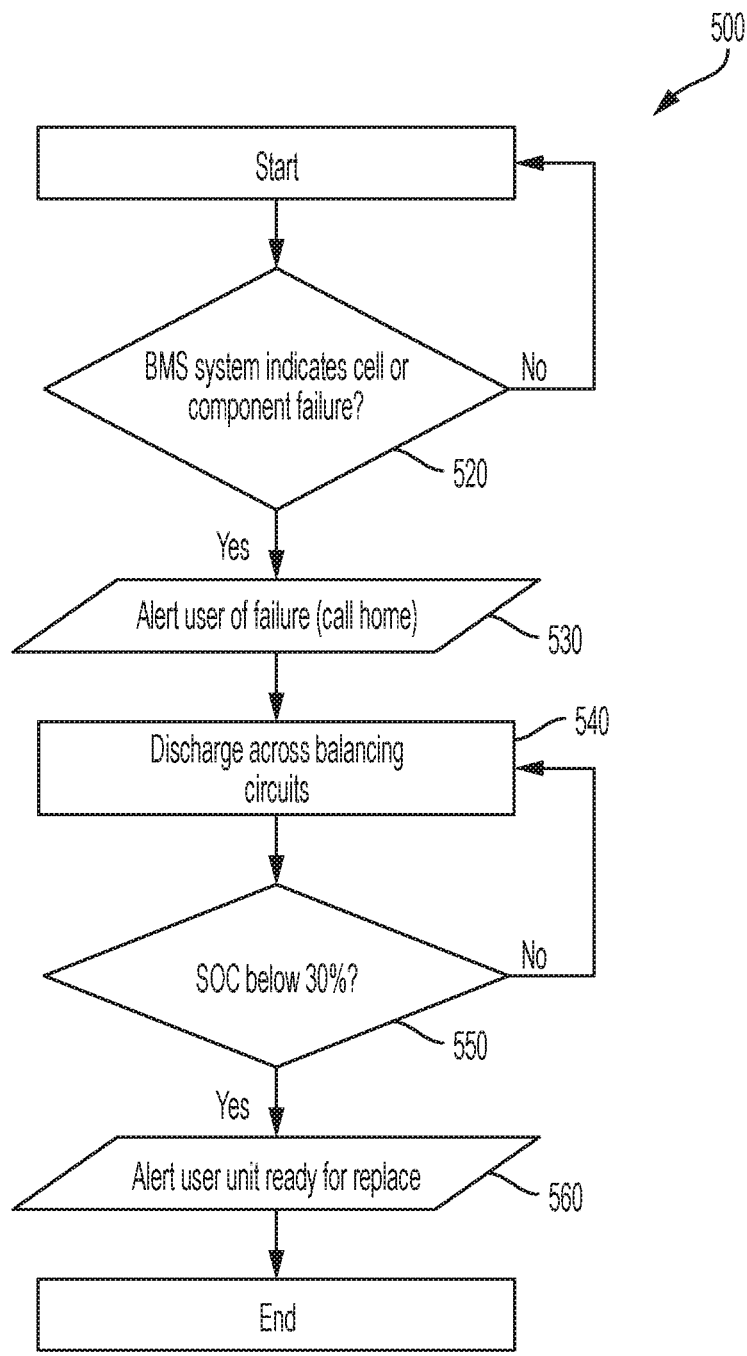
FIG. 3 depicts a flow diagram illustrating a method for discharging the battery pack to a desired SoC after a fault event according to embodiments of the invention.

FIG. 3 is a flow diagram illustrating a method 500 for discharging to a desired SoC the battery pack 100 or the battery pack 400, containing the plurality of battery cells 250, after a fault event according to embodiments of the invention. A block 520 shows continuous monitoring by the microcontroller 270, via the monitoring chip 310 or the BMS 440, for operational conditions of each battery cell 250 or a component of battery pack 100/400 (e.g., the fuse 230). For example, the block 520 can monitor the battery pack for any of the following failures in the operational conditions: a drop in voltage output of any battery cell 250 or whether the temperature of any of the battery cell 250 has fallen outside upper or lower predetermined temperature limit values. If no failure has been detected the block 520 continues to monitor the battery packs 100/400. If the monitoring chip 310 or the BMS 440 indicates the failure event, a block 530 provides an output, namely, an alert signal indicting a failure, to a user.

A block 540 dischargefs each non-failed battery cell 250 across its corresponding balancing circuit 300. In the event of a component failure (e.g., the fuse 230), each battery cell 250 is discharged across its corresponding balancing circuit 300.

A block 550 determines SoC of each battery cell 250. If the desired SoC, for example, below 30% is not reach, a signal to continue the discharge is sent to the microcontroller 270 by the monitoring chip 310 or the BMS 440.

A block 560 shows an alert signal being sent to the user upon the desired SoC being attained through the discharge of each battery cell 250 across its corresponding balancing circuit 300. The user can now safely dispose and/or transport the battery packs 100/400.

Figure 4:
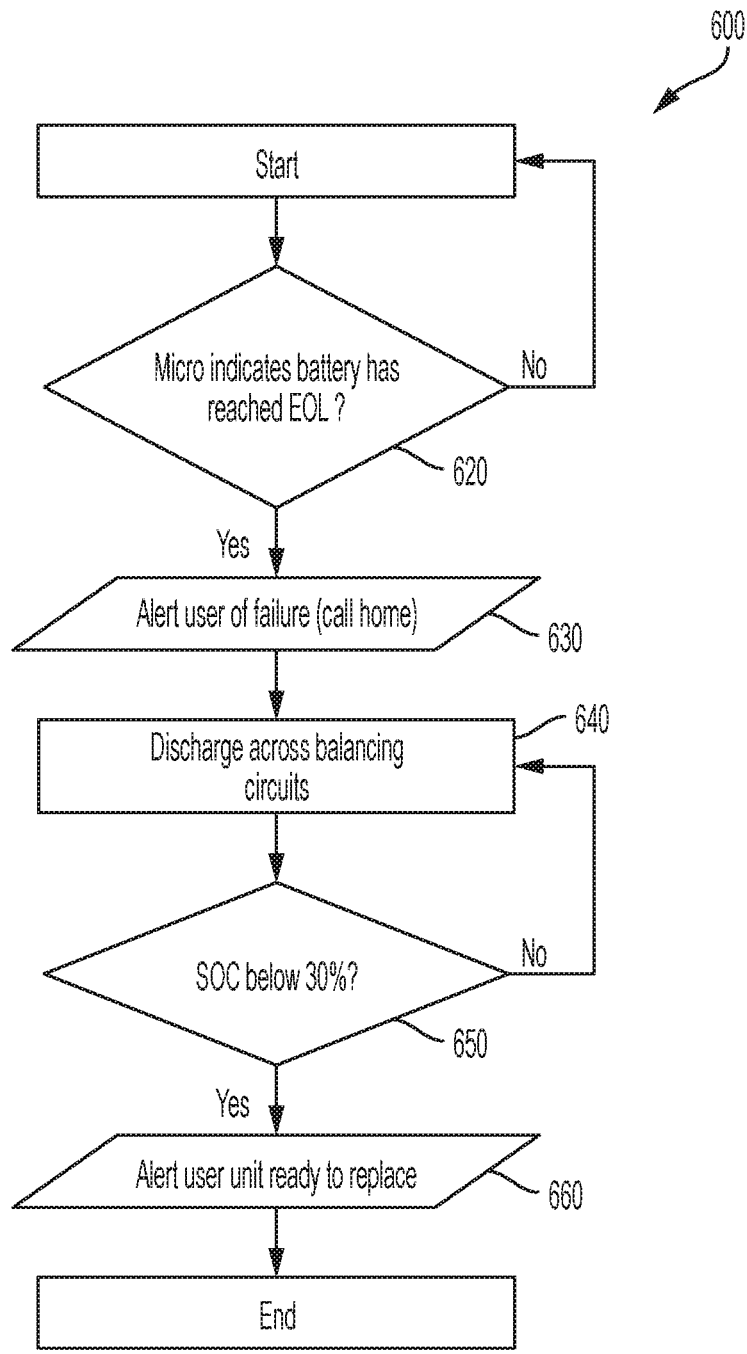
FIG. 4 depicts a flow diagram illustrating a method for discharging the battery pack to a desired SoC after the battery pack reached end of life (EoL) according to embodiments of the invention.

FIG. 4 is a flow diagram illustrating a method 600 for discharging to a desired SoC the battery pack 100 or the battery pack 400, containing the plurality of battery cells 250, after the battery packs 100/400 reached EoL according to embodiments of the present invention.

A block 620 shows continuous monitoring by the microcontroller 270, via the monitoring chip 310 or the BMS 440, of the battery pack 100/400 whether the battery pack 100/400 has reached EoL. EoL generally means that the battery pack 100/400 reached the point where the battery pack 100/400 will only hold a set percentage of its original storage capacity. One approach to determining whether the battery pack 300/400 has reached EoL is to measure its state of health (SoH). SoH is an overview of the overall operational condition of a battery by assessing how closely a battery meets its design specifications. According to embodiments of the present invention, any known methods for determining SoH can be used. For example, continues measuring of the internal resistance of each battery cell 250 can be used to determine SoH. Excessive internal resistance indicates that the battery cell 250 is reaching EoL.

If no predetermined indicators for EoL have been detected the block 620 continues to monitor the battery pack 100/400. If the monitoring chip 310 or the BMS 440 indicate that the battery pack 100/400 has reached EoL, a block 630 provides an alert signal indicating a failure to a user.

A block 640 dischargers each battery cell 250 across its corresponding balancing circuit 300 to the desired SoC.

A block 650 determines SoC of each battery cell 250. If the desired SoC, for example, below 30% is not reach, a signal to continue the discharge is sent to the microcontroller 270 by the monitoring chip 310 or the BMS 440.

A block 660 shows an alert signal being sent to the user upon the desired SoC being attained through the discharge of each battery cell 250 across its corresponding balancing circuit 300. The user can now safely dispose and/or transport the battery pack 100.

Figure 5:
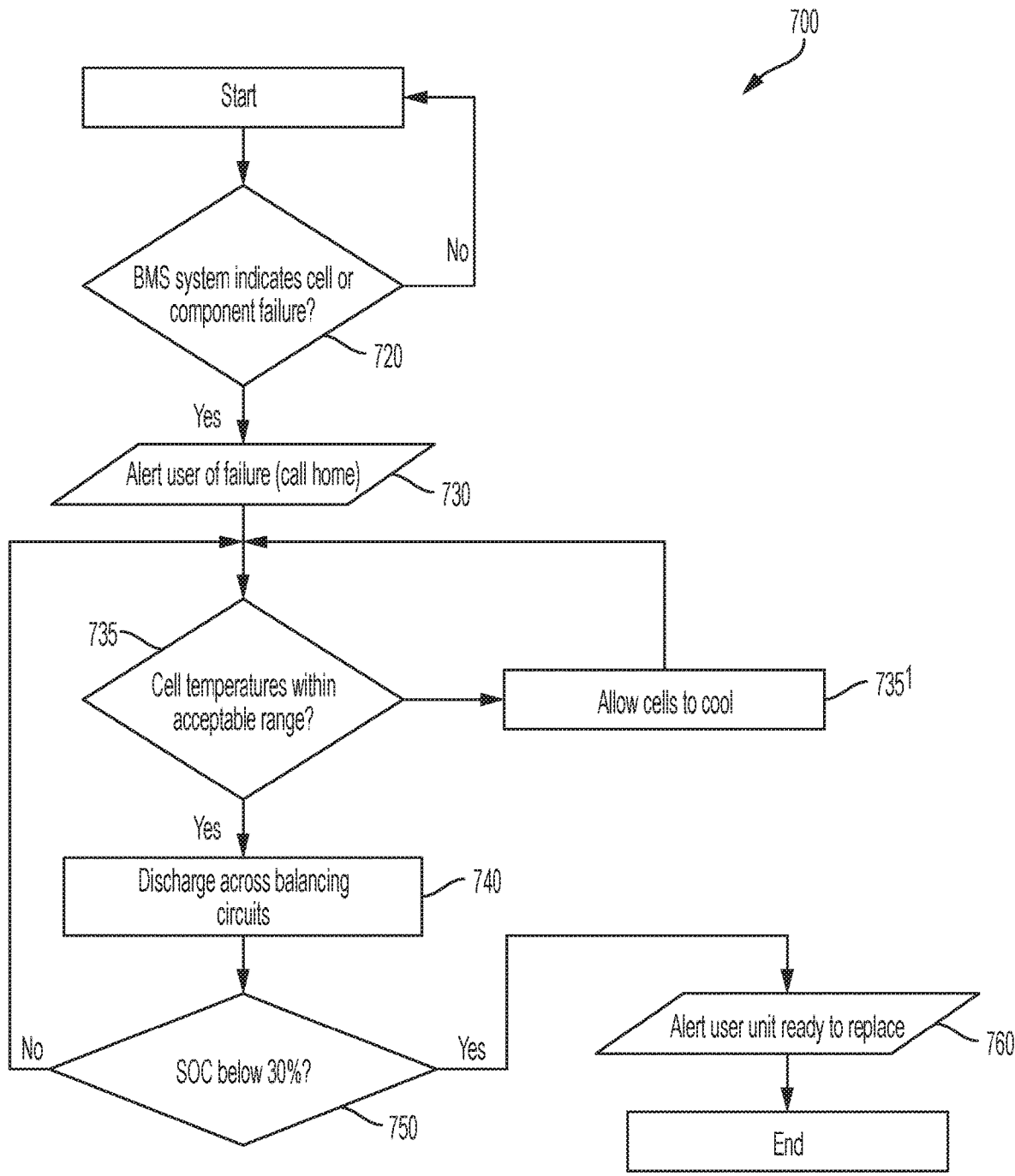
FIG. 5 depicts a flow diagram illustrating a method for discharging the battery pack after a cooling system failure or use of the suicide switch according to embodiments of the invention.

FIG. 5 is a flow diagram illustrating a method 700 for discharging to a desired SoC the battery pack 100 or the battery pack 400, containing the plurality of battery cells 250, in case of a failed cooling system (not shown) according to embodiments of the invention.

A block 720 shows continuous monitoring of the cooling system by the microcontroller 270, via the monitoring chip 310 or the BMS 440. If no failure has been detected the block 620 continues to monitor the battery pack 100/400. If the monitoring chip 310 or the BMS 440 indicate the failure event, a block 730 provides an alert signal indicating a failure to a user.

If the temperature of any of the battery cell 250 has fallen outside upper predetermined temperature limit values, the battery cell 250 is allowed to cool as indicated a block 735'.

If the temperature of any of the battery cell 250 are below the upper predetermined temperature limit values as indicated in a block 735, a block 740 dischargers each battery cell 250 across its corresponding balancing circuit 300 to a desired SoC.

A block 750 determines SoC of each battery cell 250. If the desired SoC, for example, below 30%, is not reached, a signal to continue the discharge is sent to the microcontroller 270 by the monitoring chip 310 or the BMS 440.

A block 760 shows an alert signal being sent to the user upon the desired SoC being attained through the discharge of each battery cell 250 across its corresponding balancing circuit 300. The user can now safely dispose and/or transport the battery pack 100.

Figure 6:
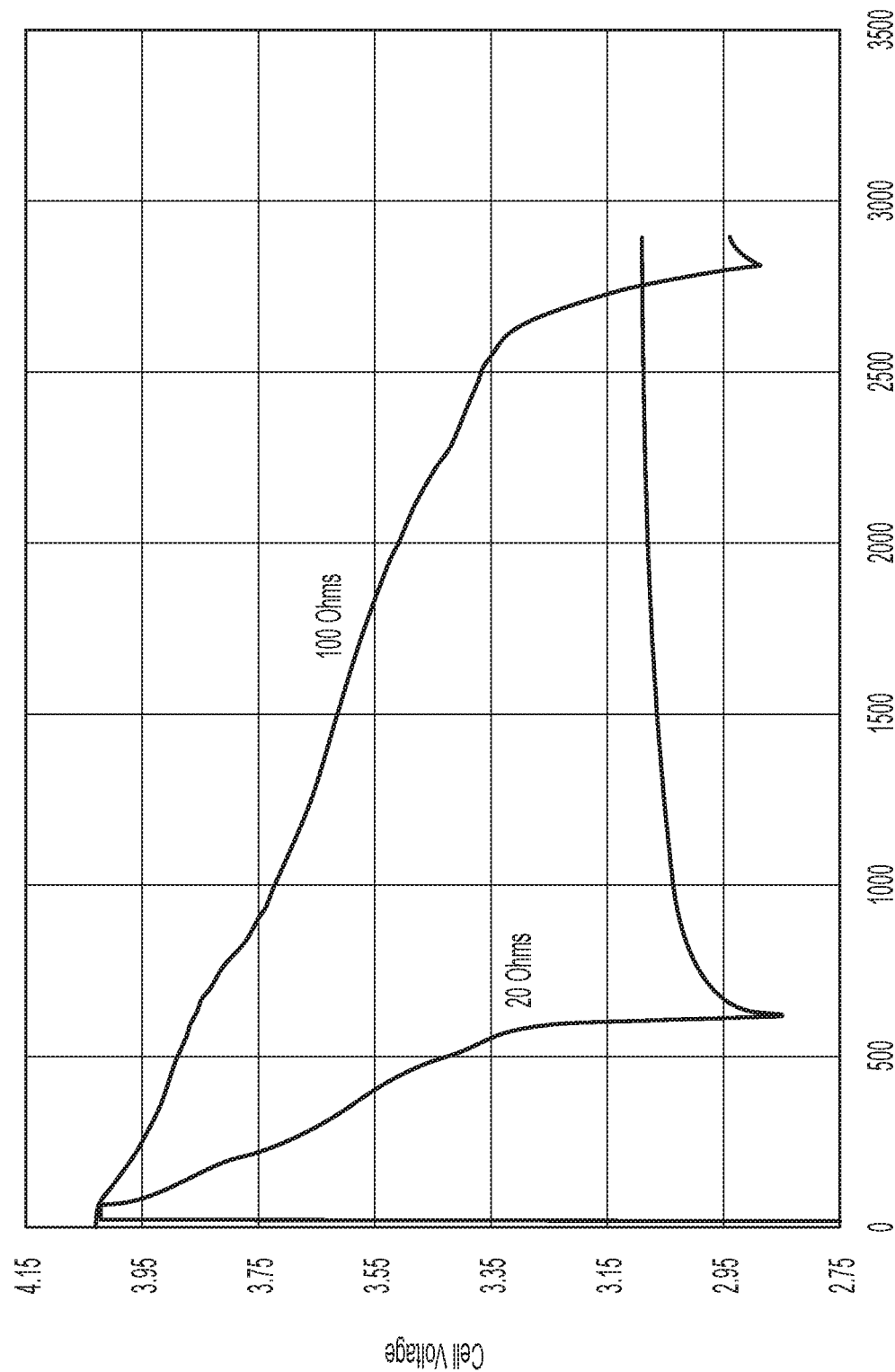
FIG. 6 depicts an exemplary plot of an experimental data for the battery pack discharging a simulated balancing load according to embodiments of the invention.

FIG. 6 shows an exemplary plot of an experimental data for the battery pack 100 discharging a simulated balancing load in accordance with embodiments of the present invention. The duration of the discharge is dependent on SoC of the battery pack 100 during beginning of the discharging process. However, as illustrated by FIG. 6, the estimated duration of the discharge across the balancing circuits 300 is less than 48 hours for the battery pack 100 being at 100% SoC in the beginning of the discharge.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possible equivalent variations and equivalent arrangements.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A battery pack configured for discharging to a desired state of charge (SoC) after a fault event, the battery pack comprising:
    a plurality of battery cells;
    a balancing circuit connected to each of the battery cells;
    a microcontroller configured to receive operational values of each of the battery cells, compare the operational conditions values of each of the battery cells to a prescribed threshold values and issue commands to selectively discharge one or more of the battery cells; and
    a battery management system configured to receive the operational values from each of the battery cells,
    wherein the battery management system communicates the operational conditions and values of each of the battery cells to the microcontroller or receives a command from the microcontroller to selectively discharge one or more of the battery cells, and
    wherein the microcontroller disconnects the battery cells from itself upon completion of the discharge of one or more of the battery cells.

2. The battery pack according to claim 1, wherein the plurality of battery cells comprises lithium-ion battery cells.

3. The battery pack according to claim 2, wherein the balancing circuit comprises:
    a field-effect transistor (FET) corresponding to each of the battery cells configured to selectively discharge the battery cell across the balancing circuit upon receiving a command from the microcontroller; and
    a balancing resistor.

4. The battery pack according to claim 1, wherein the operational values for each of the battery cells comprise a voltage value and/or a temperature value.

5. A method for discharging a battery pack to a desired state of charge (SoC) after a fault event, the method comprising:
    monitoring the battery pack, wherein the battery pack comprises:
        a plurality of battery cells;
        a balancing circuit connected to each of the battery cells, wherein the balancing circuit is configured to measure operational values of each of the battery cells; and
        a microcontroller configured to receive the operational values from the balancing circuit, compare the operational values to a prescribed threshold values and issue commands to selectively discharge one or more of the battery cells;
    discharging to the desired SoC of each of the battery cells that has SoC above the desired SoC;
    determining whether the desired SoC is reached;
    sending an alert signal to a user upon the desired SoC being reached; and
    disconnecting the battery pack from a system.

6. The method of claim 5, wherein the fault event is a component failure.

7. The method of claim 6, wherein each of the battery cells is individually discharged across the corresponding balancing circuited to the desired SoC.

8. The method of claim 5, wherein the battery pack further comprises:
    an ambient temperature sensor that is positioned outside the balancing circuit and in communication with the microcontroller, wherein the ambient temperature sensor communicates the sensed ambient temperature within the battery pack to the microcontroller.

9. The method of claim 5, wherein the balancing circuit comprises:
    a field-effect transistor (FET) corresponding to each of the battery cells configured to selectively discharge the battery cell across the balancing circuit upon receiving a command from the microcontroller;
    a balancing resistor; and
    a thermistor coupled to each of the battery cells.

10. The method of claim 9 further comprising:
    determining if a temperature of any of the battery cells is above an upper predetermined temperature limit value; and
    allowing the battery cells to cool by suspending the discharging if the temperature is determined to be above the upper predetermined temperature limit value.

11. A method for discharging a battery pack to a desired state of charge (SoC) upon reaching End of Life (EoL), the method comprising:
    monitoring the battery pack for predetermined EoL indicators, wherein the battery pack comprises:
        a plurality of battery cells;
        a balancing circuit connected to each of the battery cells, wherein the balancing circuit is configured to measure operational values of each of the battery cells; and
        a microcontroller configured to receive the operational values from the balancing circuit, compare the operational values to a prescribed threshold values and issue commands to selectively discharge one or more of the battery cells;
    discharging to the desired SoC of each of the battery cells across the corresponding balancing circuit upon detection of the predetermined EoL indicators;
    determining whether the desired SoC is reached;
    sending an alert signal to a user upon the desired SoC being reached; and
    disconnecting the battery pack from a system.

12. The method of claim 11, wherein the predetermined EoL indicators comprise an internal resistance of the battery cells.

13. The method of claim 11, wherein the balancing circuit comprises:
    a field-effect transistor (FET) corresponding to each of the battery cells configured to selectively discharge the battery cell across the balancing circuit upon receiving a command from the microcontroller;
    a balancing resistor; and
    a thermistor coupled to each of the battery cells.

* * * * *